(12) United States Patent
Schwarz et al.

(10) Patent No.: US 10,436,121 B2
(45) Date of Patent: *Oct. 8, 2019

(54) ELONGATED GEARED TURBOFAN WITH HIGH BYPASS RATIO

(71) Applicant: UNITED TECHNOLOGIES CORPORATION, Hartford, CT (US)

(72) Inventors: Frederick M. Schwarz, Glastonbury, CT (US); Robert E. Malecki, Storrs, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,886

(22) Filed: Sep. 27, 2013

(65) Prior Publication Data

US 2014/0283501 A1 Sep. 25, 2014

Related U.S. Application Data

(62) Division of application No. 13/792,303, filed on Mar. 11, 2013.

(Continued)

(51) Int. Cl.
  *F02K 3/06* (2006.01)
  *F02C 7/36* (2006.01)
  (Continued)

(52) U.S. Cl.
  CPC .............. *F02C 7/36* (2013.01); *B64D 33/02* (2013.01); *F02C 3/10* (2013.01); *F02K 3/06* (2013.01);
  (Continued)

(58) Field of Classification Search
  CPC .............. F02K 1/04; F02K 3/06; F02K 3/068
  (Continued)

(56) References Cited

U.S. PATENT DOCUMENTS

3,287,906 A   11/1966   McCormick
3,830,431 A * 8/1974   Schwartz ................ 239/265.11
(Continued)

FOREIGN PATENT DOCUMENTS

EP   2065585 A2   6/2009
GB   1516041      6/1978
(Continued)

OTHER PUBLICATIONS

International Search Report and Written Opinion for International Application No. PCT/US2014/014367 completed on May 7, 2014.
(Continued)

*Primary Examiner* — Arun Goyal
(74) *Attorney, Agent, or Firm* — Carlson, Gaskey & Olds, P.C.

(57) ABSTRACT

A propulsion system includes a fan, a gear, a turbine configured to drive the gear to, in turn, drive the fan. The turbine has an exit point, and a diameter ($D_t$) is defined at the exit point. A nacelle surrounds a core engine housing. The fan is configured to deliver air into a bypass duct defined between the nacelle and the core engine housing. A core engine exhaust nozzle is provided downstream of the exit point. A downstream most point of the core engine exhaust nozzle is defined at a distance from the exit point. A ratio of the distance to the diameter is greater than or equal to about 0.90.

30 Claims, 3 Drawing Sheets

Related U.S. Application Data

(60) Provisional application No. 61/761,359, filed on Feb. 6, 2013.

(51) Int. Cl.
| | |
|---|---|
| *F02C 3/10* | (2006.01) |
| *F02K 3/068* | (2006.01) |
| *B64D 33/02* | (2006.01) |
| *F02C 3/107* | (2006.01) |

(52) U.S. Cl.
CPC ...... *F02K 3/068* (2013.01); *B64D 2033/0286* (2013.01); *F02C 3/107* (2013.01); *F05D 2220/36* (2013.01); *Y02T 50/672* (2013.01)

(58) Field of Classification Search
USPC .......... 60/226.1, 262, 770; 239/127.1, 127.3, 239/265.11, 265.17
See application file for complete search history.

(56) References Cited

U.S. PATENT DOCUMENTS

| | | | |
|---|---|---|---|
| 3,881,315 A * | 5/1975 | Hess et al. .................. | 60/226.1 |
| 4,147,029 A | 4/1979 | Sargisson | |
| 5,810,276 A | 9/1998 | Fiske et al. | |
| 5,915,917 A | 6/1999 | Eveker et al. | |
| 7,043,898 B2 | 5/2006 | Rago | |
| 7,966,827 B2 * | 6/2011 | Alletzhauser .................. | 60/770 |
| 8,337,153 B2 * | 12/2012 | Orosa ........................ | 415/182.1 |
| 2007/0151228 A1 * | 7/2007 | Smith .......................... | 60/226.1 |
| 2007/0157597 A1 | 7/2007 | Sharp | |
| 2008/0302907 A1 | 12/2008 | Schafer | |
| 2009/0139243 A1 * | 6/2009 | Winter ............................ | 60/802 |
| 2010/0005778 A1 * | 1/2010 | Chaudhry .................... | 60/226.3 |
| 2010/0148396 A1 | 6/2010 | Xie et al. | |
| 2010/0303607 A1 | 12/2010 | Orosa | |
| 2010/0331139 A1 | 12/2010 | McCune | |
| 2013/0014490 A1 | 1/2013 | Suciu et al. | |

FOREIGN PATENT DOCUMENTS

| | | |
|---|---|---|
| GB | 2041090 | 9/1980 |
| WO | 2007038674 | 4/2007 |

OTHER PUBLICATIONS

Denos, R. et al., "Geared Fan," Aero-Engine Design: From State-of-the-Art Turbofans Towards Innovative Architectures, Lecture Series, Mar. 3, 2008, pp. 1-26.
Zimbrick, R. A., et al., "Investigation of Very High Bypass Ratio Engines for Subsonic Transports," Journal of Propulsion and Power, American Institute of Aeronautics and Astronautics, Jul. 1, 1990, vol. 6, No. 4, pp. 490-496.
Supplementary European Search Report for European Application No. 14749309.2 dated Sep. 2, 2016.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-151.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Nendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

(56) References Cited

OTHER PUBLICATIONS

Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
International Preliminary Report on Patentability for International Application No. PCT/US20141014367 dated Aug. 20, 2015.

* cited by examiner

ELONGATED GEARED TURBOFAN WITH HIGH BYPASS RATIO

CROSS-REFERENCE TO RELATED APPLICATIONS

This application is a divisional of U.S. patent application Ser. No. 13/792,303, filed Mar. 11, 2013, which claims priority to provisional application Ser. No. 61/761,359 filed Feb. 6, 2013.

BACKGROUND

Gas turbine engines are known, and when utilized on an airplane, typically have a fan that delivers air both into a bypass duct defined inwardly of a nacelle and into a core duct the leads to a compressor. The air is compressed in the compressor and delivered into a combustor where it is mixed with fuel and ignited. Products of this combustor pass downstream over turbine rotors driving them to rotate. The turbine rotors, in turn, drive the fan and the compressor.

Historically, a fan drive turbine drove both the fan and a low pressure compressor through a direct drive connection such that all of the fan drive turbine, the fan, and the low pressure compressor rotated at the same angular velocity. By tying the speed of the fan to the fan drive turbine, this not only limited the speed of the fan drive turbine, but also was a design restriction on the diameter and speed of the fan. For many reasons, it would be desirable for the fan to rotate at a slower speed, thereby enabling it to be radially larger.

More recently, a gear reduction has been provided between the fan drive turbine and the fan. The gear reduction has allowed the fan diameter to increase dramatically. With the increase in fan's diameter, a bypass ratio, or volume of air delivered into the bypass duct compared to the volume of air delivered into the core duct that leads to the compressor, has also increased. As a result of the increase in the bypass ratio, negative aerodynamic effects have been identified in the overall propulsion system that includes the nacelle and the engine. Accordingly, what is needed is an improved propulsion system that does not experience these negative aerodynamic effects.

SUMMARY

In a featured embodiment a propulsion system has a fan and a gear. A turbine is configured to drive the gear to drive the fan. The turbine has an exit point. A diameter ($D_t$) is defined at the exit point. A nacelle surrounds a core engine housing. The fan is configured to deliver air into a bypass duct defined between the nacelle and the core engine housing. A core engine exhaust nozzle is downstream of the exit point. A downstream most point of the core engine exhaust nozzle is defined at a distance ($L_c$ or $L_n$) from the exit point. A ratio of the distance ($L_c$ or $L_n$) to the diameter ($D_t$) is greater than or equal to about 0.90.

In another embodiment according to the previous embodiment, the core engine exhaust nozzle includes a plug. The downstream most point of the core engine exhaust nozzle is defined by a downstream end of the plug. The ratio is greater than or equal to about 1.06.

In another embodiment according to any of the previous embodiments, the ratio is greater than or equal to about 1.20.

In another embodiment according to any of the previous embodiments, a plug is received within the core engine exhaust nozzle. A downstream end of the core engine exhaust nozzle extends downstream of a downstream most end of the plug. The distance ($L_n$) is defined to a downstream most end of the core engine exhaust nozzle. The ratio is greater than or equal to about 1.02.

In another embodiment according to any of the previous embodiments, the ratio is greater than or equal to about 1.17.

In another embodiment according to any of the previous embodiments, a bypass ratio is greater than about 6.

In another embodiment according to any of the previous embodiments, the bypass ratio is greater than about 10.

In another embodiment according to any of the previous embodiments, an exhaust case is positioned between the turbine and the core engine exhaust nozzle.

In another featured embodiment, a propulsion system has a fan and a gear. A turbine is configured to drive the gear to drive the fan. The turbine has an exit point. A diameter ($D_t$) is defined at the exit point. A nacelle surrounds a core engine housing. The fan is configured to deliver air into a bypass duct defined between the nacelle and the core engine housing. A core engine exhaust nozzle is downstream of the exit point. The core engine exhaust nozzle has a plug. A downstream most point of the core engine nozzle is defined by a downstream end of the plug at a distance ($L_c$) from the exit point. A ratio of the distance ($L_c$) to the diameter ($D_t$) is greater than or equal to about 1.06.

In another embodiment according to the previous embodiment, the ratio is greater than or equal to about 1.20.

In another embodiment according to any of the previous embodiments, an exhaust case is positioned between the exit of the turbine and an entrance to the engine exhaust nozzle.

In another embodiment according to any of the previous embodiments, a bypass ratio is greater than about 6.

In another embodiment according to any of the previous embodiments, the bypass ratio is greater than about 10.

In another featured embodiment, a propulsion system has a fan and a gear. A turbine is configured to drive the gear to drive the fan. The turbine has an exit point. A diameter ($D_t$) is defined at the exit point. A nacelle surrounds a core engine housing. The fan is configured to deliver air into a bypass duct defined between the nacelle and the core engine housing. A core engine exhaust nozzle is downstream of the exit point. A downstream most point of the core engine exhaust nozzle is downstream of an internal plug received within the core engine exhaust nozzle. The downstream most point is defined at a distance ($L_n$) from the exit point. A ratio of the distance ($L_n$) to the diameter ($D_t$) is greater than or equal to about 0.90.

In another embodiment according to the previous embodiment, the ratio is greater than or equal to about 1.02.

In another embodiment according to any of the previous embodiments, the ratio is greater than or equal to about 1.17.

In another embodiment according to any of the previous embodiments, an exhaust case is positioned between the exit of the turbine and an entrance to the engine exhaust nozzle.

In another embodiment according to any of the previous embodiments, a bypass ratio is greater than about 6.

In another embodiment according to any of the previous embodiments, the bypass ratio is greater than about 10.

In another embodiment according to any of the previous embodiments, a gear ratio of the gear is greater than or equal to about 2.3.

These and other features may be best understood from the following drawings and specification.

DETAILED DESCRIPTION

Figure 1:
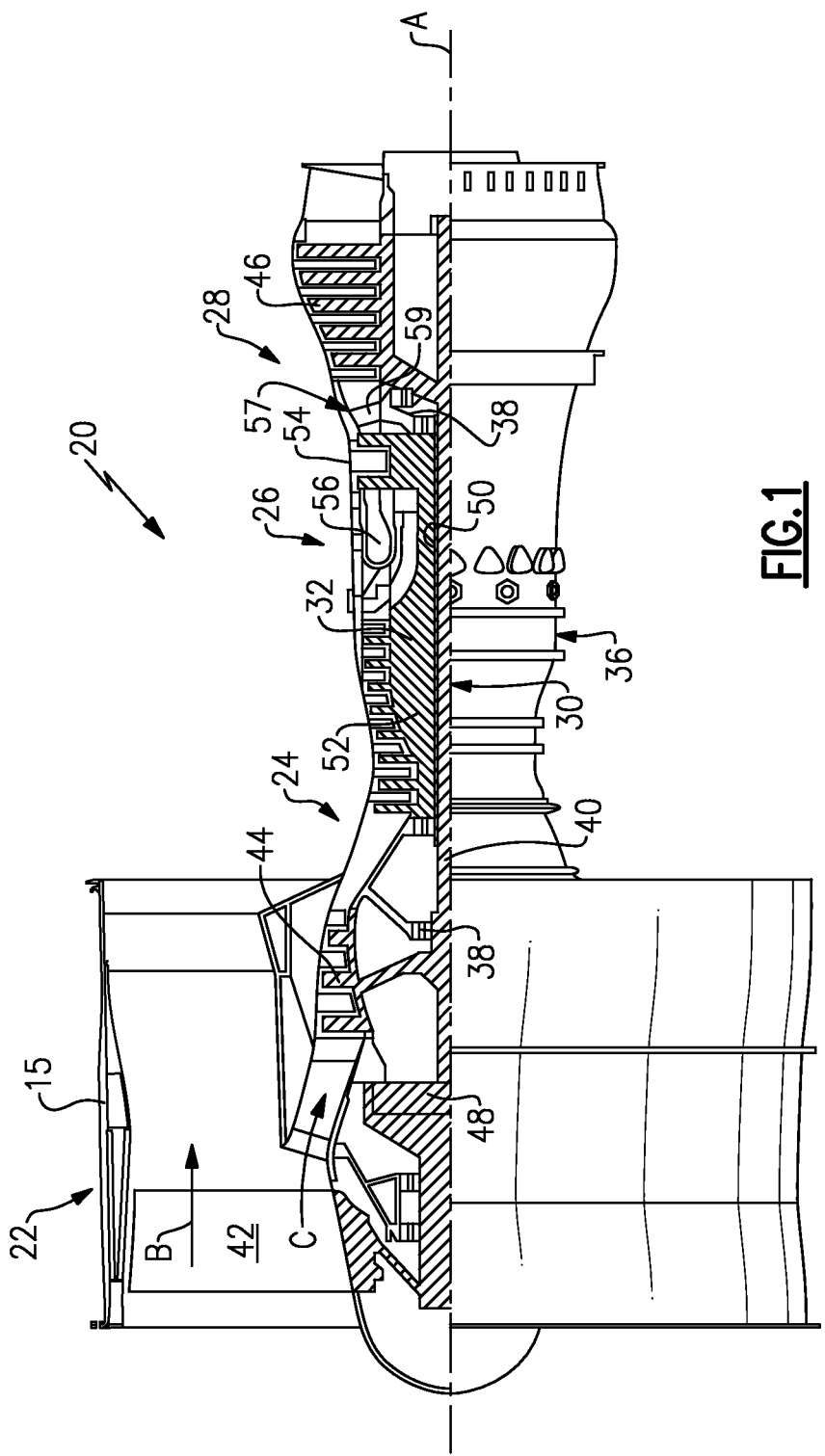
FIG. 1 schematically shows a gas turbine engine.

FIG. 1 schematically illustrates a gas turbine engine 20. The gas turbine engine 20 of FIG. 1 is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 31 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear architecture 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 (2.3:1) and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
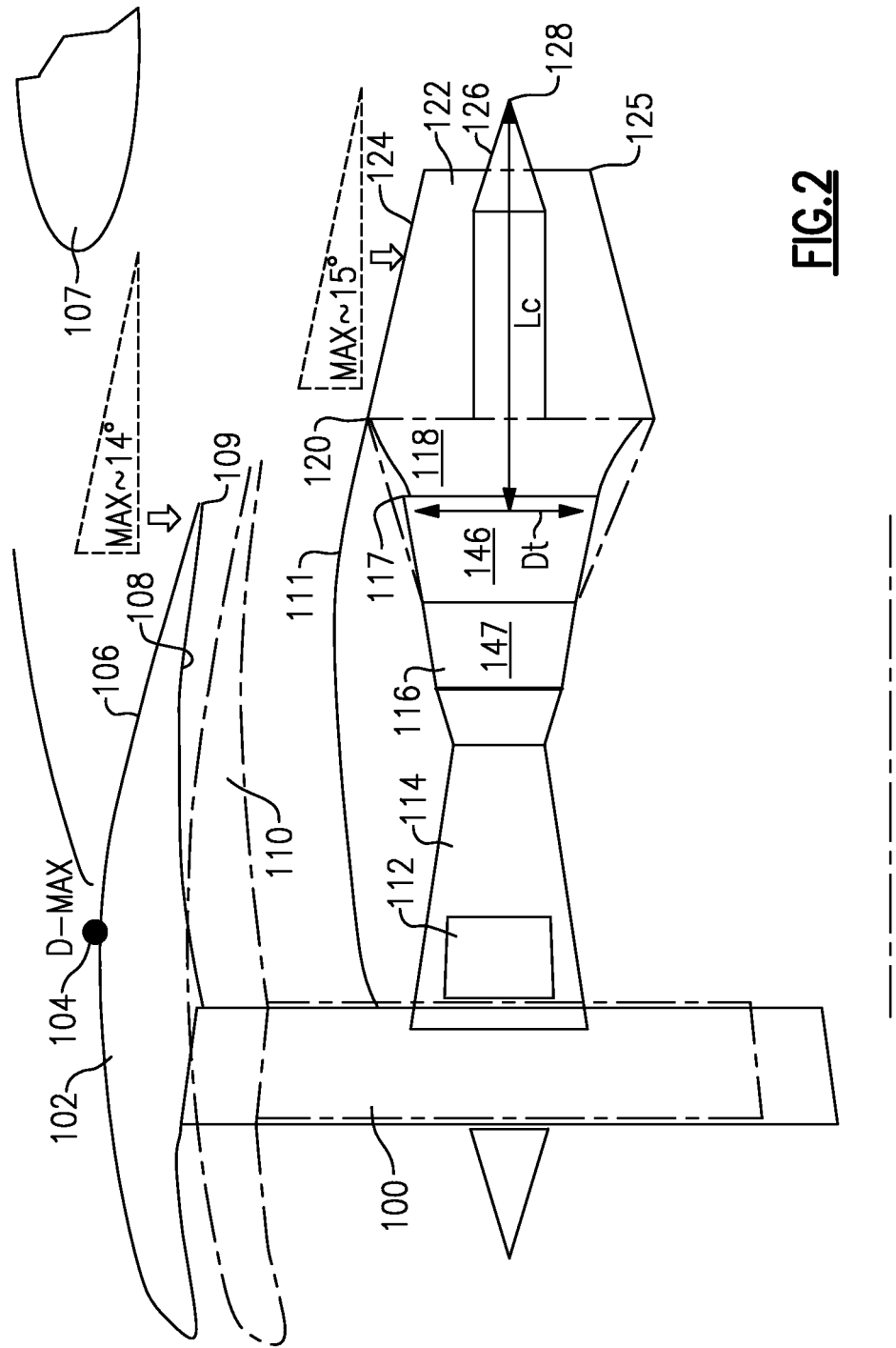
FIG. 2 shows a first embodiment of an improved propulsion system according to the present invention.

In high bypass ratio engines, a nacelle 102 as shown in FIG. 2 will have a relatively great diameter. A fan 100 is shown within the nacelle 102, somewhat schematically. The fan is driven by a gear drive 112, and driven by a fan drive turbine 146 in a turbine section 116. Turbine section 116 may include a higher pressure turbine 147 upstream of the fan drive turbine 146. A compressor 114 is also illustrated. A diameter $D_t$ is defined as the diameter of the last blade airfoil stage 117 in the fan drive turbine section 146.

A core engine exhaust nozzle 122 has an inner periphery 124 which tapers downwardly to define a nozzle at an end point 125. The angle at which the nozzle tapers has a maximum defined by balancing aerodynamic characteristics and core engine exhaust nozzle weight. As an example, the maximum angle may be approximately greater than twelve degrees or less than seventeen degrees, and preferably between fourteen and sixteen degrees, and most preferably at fifteen degrees, all measured relative to the horizontal.

A plug 126 is shown to extend beyond an end point 125 of a housing of the core engine exhaust nozzle 122. The plug has a downstream most end 128.

The use of a gear drive 112 reduces the overall length of the turbine section 116 as compared to conventional direct drive turbofan engines. As an example, a direct drive turbofan engine capable of producing a similar amount of thrust as the engine embodiment shown in FIG. 2, may have its last turbine airfoil stage at the point 120 (schematically shown). Further, such a conventional direct drive turbofan engine typically would have a nacelle 110 (schematically shown) with a much smaller diameter as compared to the nacelle 102 of the engine embodiment shown in FIG. 2.

The nacelle 102 has a maximum diameter at point 104. To eliminate (or at least reduce) negative aerodynamic effects, an outer surface 106 of the nacelle 102, which is downstream of the point 104, also has a limitation on a maximum inwardly extending angle to prevent separation of air, balancing aerodynamic characteristics and nacelle weight. Thus, in one embodiment, the maximum angle for the surface 106 may be on the order of about fourteen degrees, again measured relative to a horizontal axis. Of course, in other embodiments, the angle may be less than fourteen degrees.

An inner surface 108 of the nacelle 102 forms a nozzle at its downstream end 109 with an outer surface 111 of a core housing. In accordance with, conventional gas turbine design principles, manufacturers would typically try to reduce weight, and thus increase fuel efficiency. Under such conventional design strategy, one of ordinary skill would typically seek to minimize the length of the core engine exhaust nozzle 122 and any exhaust case 118. That is, one might seek to minimize the length downstream of the downstream end 117 of the turbine section 116 illustrated in FIG. 2. However, Applicant has discovered that given the maximum angle for the surface 124, this would raise challenges with regard to creating an effective nozzle at point 109. To overcome this detriment, the shown embodiment increases the length of the combined exhaust case 118 and core engine exhaust nozzle 122. While the core engine exhaust nozzle 122 is illustrated starting at the point 120 at which the last turbine airfoil stage of a non-geared engine would be expected to be, this is merely for illustration simplicity. The two points need not be related. The same is true with the illustration that point 120 coincides with the downstream end of an exhaust case 118.

As a result, whereas the overall length of the turbine section 116 of the embodiment shown in FIG. 2 is shorter than the corresponding length of the turbine of a non-geared counterpart engine, the overall length of the combined exhaust case 118 and nozzle 122 of the embodiment shown in FIG. 2 is longer than would be expected.

To define the length of the nozzle 122 and exhaust case 118 (if used), a dimension Lc is defined from the point 117 to the point 128.

As an example, in one engine, $D_t$ was 27.6 in., and $L_c$ was 33.5 in. This results in a ratio of about 1.21. In another engine example, where $D_t$ was 33.5 in. and $L_c$ was 43.7 in., the ratio was about 1.30. In a third engine example, where $D_t$ was 35.9 in. and Lc was 50.0 in., the ratio was about 1.39. In another proposed engine example, where $D_t$ was 53.6 in. and $L_c$ was 88.0 in., the ratio was as high as about 1.64.

In general, this disclosure extends to geared turbofan engines with a ratio of $L_c$ to $D_t$ of equal to or above about 1.06, and more narrowly equal to or above about 1.20.

Figure 3:
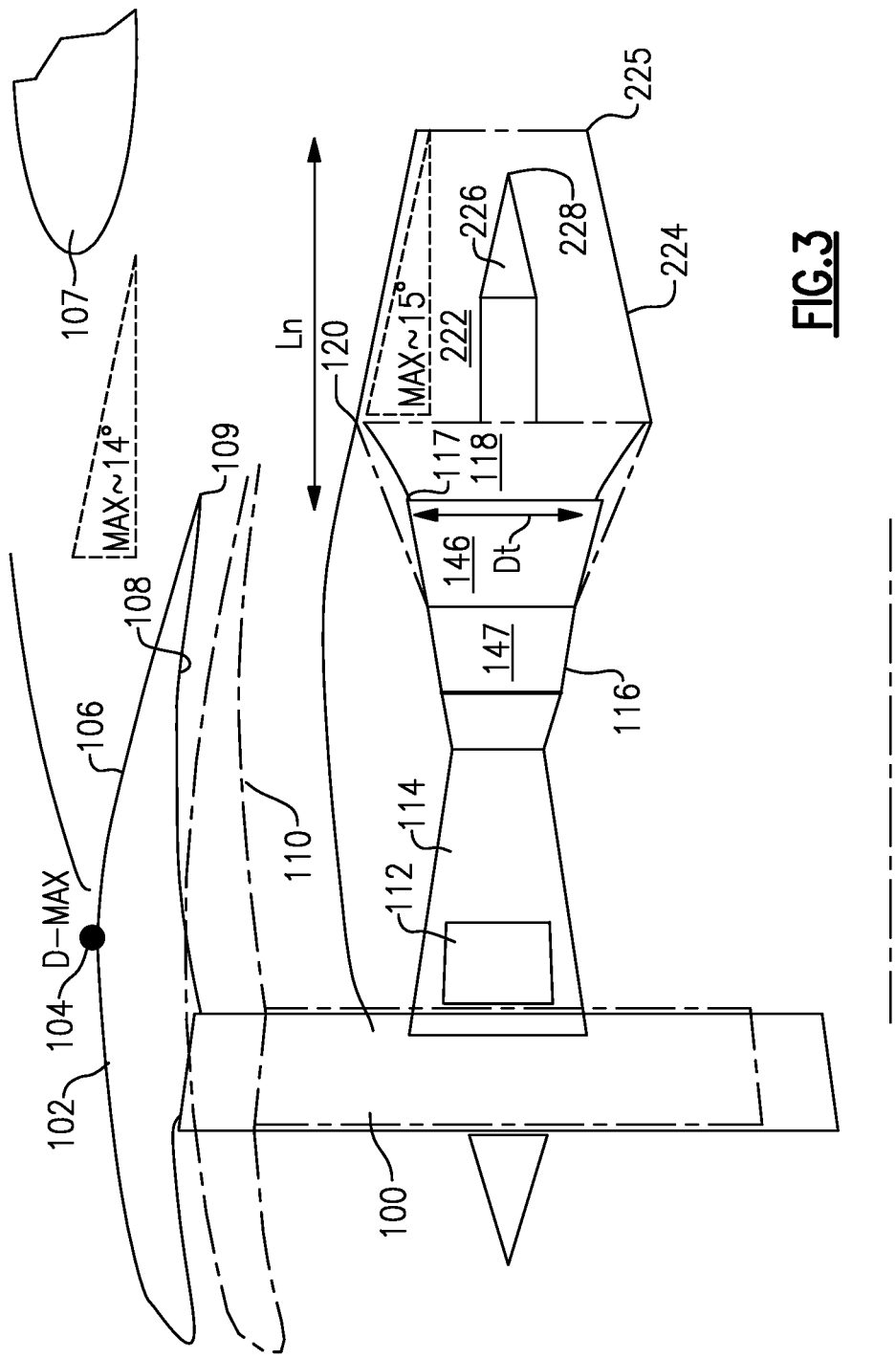
FIG. 3 shows a second embodiment of an improved propulsion system according to the present invention.

FIG. 3 shows another embodiment, which is generally the same as the FIG. 2 embodiment, other than the plug 226 does not extend beyond the downstream end 225 of a housing of the core engine exhaust nozzle 222. Again, in the shown embodiment, the inward movement of the surface 224 in the nozzle is limited to a maximum angle of about fifteen degrees measured relative to the horizontal, and thus an exhaust case 118 is also utilized in this embodiment. A dimension $L_n$ is defined between the point 117 at the downstream end of the fan drive turbine section 146 of the turbine section 116 and the point 225 at the downstream end of the nozzle 222.

In one such engine example, where $D_t$ was 27.6 in. and $L_n$ was 28.2 in., the ratio was about 1.02. In another engine example, where $D_t$ was 33.5 in. and $L_n$ was 34.6 in., the ratio was about 1.03. In another engine example, wherein $D_t$ was 35.9 in. and $L_n$ was 38.8 in., the ratio was about 1.08. In another proposed engine, where $D_t$ was 53.6 in. and $L_n$ was 69.2 in., the ratio was about 1.29.

In general, this disclosure extends to geared turbofan engines with a ratio of Ln to $D_t$ equal to or above about 0.90, more narrowly above about 1.02, and more narrowly above about 1.17.

For purposes of this application, the plug and housing are collectively part of a core engine exhaust nozzle, such that points 128 and 225 are the respective downstream most points of the core engine exhaust nozzle.

The core engine exhaust nozzle itself should have sufficient stiffness, and should be formed of a material that would have appropriate strength characteristics at 1,200° F. A material with a density of about 0.3 lbs./in.$^3$ may be utilized to reduce the overall weight. In one embodiment, the core engine exhaust nozzle 122/222 may be formed of rolled sheet stock, with a thickness less than 2.5 percent of a diameter of an inner flow path of a turbine. In another embodiment, the core nozzle may be formed of a sandwich structure, or may be formed to have a corrugated shape to reduce weight. In another embodiment, the core engine exhaust nozzle may be formed of ceramic matrix composites. Of course, other materials for the core exhaust nozzle are possible and are fully within the scope of this disclosure.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A propulsion system comprising:
a fan section including a fan;
a gear system, wherein said gear system is an epicyclic gear train;
a turbine section incorporating a high pressure turbine and a fan drive turbine that drives said gear system that drives said fan, said turbine section having an exit point at a last blade airfoil stage, and a diameter ($D_t$) defined as the diameter of said last blade airfoil stage in the turbine section at said exit point;
a compressor section including at least two compressor rotors with said high pressure turbine driving a high pressure compressor rotor and there being a lower pressure compressor rotor also being driven;
a nacelle surrounding a core engine housing, said fan delivers air into a bypass duct defined between said nacelle and said core engine housing to said low pressure compressor, and a bypass ratio defined as a volume of air delivered into said bypass duct compared to the volume of air delivered into said core engine housing;
a core engine exhaust nozzle downstream of said exit point, with a downstream most point of said core engine exhaust nozzle being downstream of an internal plug received within said core engine exhaust nozzle and said downstream most point of said core engine exhaust nozzle being defined at a distance ($L_n$) from the exit point,
wherein a distance/diameter ratio of said distance ($L_n$) to said diameter ($D_t$) is greater than or equal to 0.90; and
the bypass ratio is greater than 6.

2. The propulsion system as set forth in claim 1, wherein said distance/diameter ratio is greater than or equal to 1.02.

3. The propulsion system as set forth in claim 2, wherein said distance/diameter ratio is greater than or equal to 1.17.

4. The propulsion system as set forth in claim 2, wherein an exhaust case is positioned between said fan drive turbine and said core engine exhaust nozzle.

5. The propulsion system as set forth in claim 1, wherein an exhaust case is positioned between said fan drive turbine and said core engine exhaust nozzle.

6. The propulsion system as set forth in claim 5, wherein said nacelle includes an outer surface downstream of a maximum diameter of said nacelle, said outer surface tapering inwardly at a first angle to define a trailing edge, and a maximum value of said first angle is less than or equal to 14 degrees.

7. The propulsion system as set forth in claim 6, wherein said core engine exhaust nozzle includes an inner periphery adjacent to a bypass flow path and disposed about said internal plug, said inner periphery tapering inwardly at a second angle to define a trailing edge, and a maximum value of said second angle is less than 17 degrees.

8. The propulsion system as set forth in claim 7, wherein the bypass ratio is greater than 10, and a gear ratio of said gear system is greater than or equal to 2.3.

9. The propulsion system as set forth in claim 8, wherein said high pressure turbine is a two stage high pressure turbine.

10. The propulsion system as set forth in claim 9, wherein said fan section has only a single fan stage comprising said fan.

11. The propulsion system as set forth in claim 10, wherein said ratio of said distance ($L_n$) to said diameter ($D_t$) is less than or equal to 1.29.

12. The propulsion system as set forth in claim 8, wherein said ratio of said distance ($L_n$) to said diameter ($D_t$) is greater than or equal to 1.20.

13. The propulsion system as set forth in claim 12, wherein said second angle is greater than 12 degrees.

14. The propulsion system as set forth in claim 13, wherein said high pressure turbine is a two stage high pressure turbine.

15. The propulsion system as set forth in claim 14, wherein said fan section has only a single fan stage comprising said fan.

16. The propulsion system as set forth in claim 15, wherein said ratio of said distance ($L_n$) to said diameter ($D_t$) is less than or equal to 1.29.

17. A propulsion system comprising:
a fan section including a fan;
a gear system;
a turbine section incorporating a high pressure turbine and a fan drive turbine that drives said gear system that drives said fan, said turbine section having an exit point at a last blade airfoil stage, and a diameter ($D_t$) defined as the diameter of the last blade airfoil stage in the turbine section at said exit point;
a compressor section including at least two compressor rotors with said high pressure turbine driving a high pressure compressor rotor and there being a lower pressure compressor rotor also being driven;
a nacelle surrounding a core engine housing, said fan delivers air into a bypass duct defined between said nacelle and said core engine housing to said low pressure compressor, and a bypass ratio defined as a volume of air delivered into said bypass duct compared to the volume of air delivered into said core engine housing;
a core engine exhaust nozzle downstream of said exit point, with a downstream most point of said core engine exhaust nozzle being downstream of an internal plug received within said core engine exhaust nozzle and said downstream most point being defined at a distance ($L_n$) from the exit point,
wherein a distance/diameter ratio of said distance ($L_n$) to said diameter ($D_t$) is greater than or equal to 0.90; and
a bypass ratio is greater than 10.

18. The propulsion system as set forth in claim 17, wherein said distance/diameter ratio is greater than or equal to 1.02.

19. The propulsion system as set forth in claim 18, wherein said distance/diameter ratio is greater than or equal to 1.17.

20. The propulsion system as set forth in claim 18, wherein an exhaust case is positioned between said fan drive turbine and said core engine exhaust nozzle.

21. The propulsion system as set forth in claim 17, wherein an exhaust case is positioned between said exit of said fan drive turbine and an entrance to said engine exhaust nozzle.

22. The propulsion system as set forth in claim 17, wherein a gear ratio of said gear system is greater than or equal to 2.3.

23. The propulsion system as set forth in claim 22, wherein an exhaust case is positioned between said fan drive turbine and said core engine exhaust nozzle.

24. The propulsion system as set forth in claim 23, wherein said nacelle includes an outer surface downstream of a maximum diameter of said nacelle, said outer surface tapering inwardly at a first angle to define a trailing edge, and a maximum value of said first angle is less than or equal to 14 degrees.

25. The propulsion system as set forth in claim 24, wherein said core engine exhaust nozzle includes an inner periphery adjacent to a bypass flow path and disposed about said internal plug, said inner periphery tapering inwardly at a second angle to define a trailing edge, and a maximum value of said second angle is less than 17 degrees.

26. The propulsion system as set forth in claim 25, wherein said high pressure turbine is a two stage high pressure turbine.

27. The propulsion system as set forth in claim 26, wherein said fan section has only a single fan stage comprising said fan.

28. The propulsion system as set forth in claim 27, wherein said ratio of said distance ($L_n$) to said diameter ($D_t$) is greater than or equal to 1.20.

29. The propulsion system as set forth in claim 28, further comprising a mid-turbine frame arranged between said high pressure turbine and said fan drive turbine, wherein said mid-turbine frame supports a plurality of bearings, and said mid-turbine frame includes airfoils in a core flow path.

30. The propulsion system as set forth in claim 29, wherein said ratio of said distance ($L_n$) to said diameter ($D_t$) is less than or equal to 1.29.

* * * * *